Patented July 14, 1953

2,645,576

UNITED STATES PATENT OFFICE 2,645,576

PURIFYING WOOD PULP

Stanley Charles Bate, Spondon, near Derby, England, assignor to Celanese Corporation of America, a corporation of Delaware No Drawing. Application February 11, 1949, Serial No. 75,963. In Great Britain March 10, 1948

2 Claims. (Cl. 92—13)

This invention relates to the production of cellulose and in particular to the production of cellulose suitable for conversion into cellulose derivatives such, for example, as cellulose acetate.

In making cellulose acetate and other cellulose derivatives the primary raw material is, of course, cellulose itself, and it is generally recognised that, if a good quality product is to be obtained, the cellulose starting material must have a high degree of purity; in particular it should have a high alpha-cellulose content, preferably over 92% and especially round about 95% or higher, and a low pentosan content, preferably below 1%. In the past, cellulose of the necessary degree of purity has been obtainable without difficulty from cotton linters, which are among the purest natural forms of cellulose available on a commercial scale. Much work has, however, been done on the production of cellulose from other sources, especially wood and cereal straw.

Cellulose can be obtained from wood, straw and other ligno-cellulosic materials by a number of different processes, of which the most important are the sulphite, soda, and kraft or sulphate processes and their various modifications. The cellulose obtained by these processes, however, is by no means pure enough for conversion into good quality cellulose acetate, and many investigations have been carried out with a view to finding methods of purifying it sufficiently without degrading it so far that a cellulose acetate of satisfactory viscosity cannot be obtained. Most of the processes developed comprise one or more treatments with an alkaline reagent, usually aqueous caustic soda of various concentrations, and one or more bleaching steps. For example U. S. Patent No. 2,054,854 of H. Dreyfus shows that successive treatments with a boiling caustic soda solution of concentration about ½%–3% and a cold caustic soda solution of concentration about 12%–15%, followed if desired by a bleach, will convert wood pulps into cellulose sufficiently pure for acetylation. While this process gives a good product, the need for employing two or more steps is a disadvantage, and considerable difficulty is sometimes found in filtering the cellulose from the cold concentrated alkali solution.

It is an object of the present invention to provide a method of purifying wood pulps, especially so-called "rayon pulps" and the like which have usually been given a preliminary purification treatment at the mill and which have an alpha-cellulose content above about 85% and a pentosan content below about 3.5%, which shall require a single stage of treatment only and which shall be free from operative difficulties such as difficulties in filtration.

In accordance with the invention, wood pulps and other impure cellulosic compositions, especially wood and straw pulps and the like having an alpha-cellulose content above 85% and a pentosan content below 3.5%, are treated with an aqueous caustic alkali solution of concentration between 15% and 22% and especially between 17% and 19% at a temperature between 40° and 60° C. (These and all alkali concentrations mentioned below and in the claims are calculated on a weight/volume basis, i. e. in grammes of alkali per 100 cc. of solution.) I have found that by this treatment it is possible to obtain in a single operation (apart from subsequent washing and drying) cellulose having an alpha-cellulose content above 92% and in most cases round about 95% and a pentosan content below 1%, which can be converted into cellulose acetate of satisfactory clarity and viscosity. Moreover, the yield of cellulose obtained from the pulp is exceptionally high, indicating that little or no useful material has been removed from the pulp with the impurities, and the separation of the cellulose from the alkali solution by filtration gives rise to no difficulty. No subsequent bleaching step is necessary.

It is usually preferable to employ more than 7 parts by weight, and especially 9–12 parts, of the alkali solution for each part (on an air-dry basis) of the cellulosic composition. It is advisable to preheat the alkali solution to about the treatment temperature before introducing the cellulosic composition; the actual treatment may, for example, last for between 45 and 90 minutes, 1 hour being usually a suitable time. At the end of the treatment the greater part of the waste alkali solution may be removed, preferably by filtration; the alkali concentration of the solution so removed is not as a rule very much lower than its concentration before the treatment, and it is one of the advantages of the invention that this waste alkali, after its concentration has been made up by the addition of fresh alkali, e. g. in the solid form or as a concentrated aqueous solution, can be used repeatedly.

After the greater part of the alkali solution has been so removed from the cellulosic composition, the composition may be washed to free it from residual alkali solution and the extracted impurities which it contains. Especially if the cellulose is subsequently to be esterified, it is very advantageous to wash out at least the greater part of the residual alkali with hot water, in particular water at a temperature above 70° C. and especially between 80° and 100° C.; the last traces of alkali may be removed by giving the composition a wash with a very dilute acid (e. g. with water slightly acidified with sulphuric or acetic acid) and preferably then washing again with water alone until the washings are substantially neutral. If an alkali cellulose is required, for instance for conversion into cellulose ethers or viscose, it is usually sufficient to wash the cellulose so that substantially all the dissolved impurities are removed without necessarily removing all the alkali. Alternatively, the cellulose can be washed with an alkaline solution.

The invention is illustrated by the following example, which shows the results of treating various wood pulps in accordance with the new process and also in accordance with two other methods of working which have in the past been proved to give good results but which are somewhat less simple than the new process.

EXAMPLE

The wood pulp was added to 10 times its weight of an 18% (weight/volume) aqueous solution of caustic soda which was already at a temperature of 50°–55° C., and the mixture was kept at this temperature for 1 hour while stirring. As much of the caustic soda solution as possible was then removed by filtration, after which the pulp was washed successively with water at 80°–90° C., cold, slightly acidified water and cold water free from acid. It was then dried and acetylated by means of acetic anhydride using sulphuric acid as catalyst and acetic acid to dissolve the cellulose acetate formed.

The first of the comparative processes (referred to in the tables as CP/1) consisted in first treating the pulp for 1 hour with 10 times its weight of a 12% caustic soda solution at about 20° C., filtering (with considerable difficulty) and washing; then boiling it at 120° C. for 1 hour with 10 times its weight of a 0.5%–1% caustic soda solution, and again filtering and washing; and finally giving a mild hypochlorite bleach, acidifying, washing and drying. The second comparative process (CP/2) was simpler and consisted in boiling the pulp at 120° C. with a 5% solution of caustic soda, washing free from alkali, giving the product a hypochlorite bleach, again washing and drying.

Six different pulps were used, referred to below as A, B, C, D, E and F. They had pentosan contents of 1.91% 2.29%, 2.76%, 2.53%, 3.12% and 2.64% respectively.

Table 1 shows the properties of the products obtained from these pulps by the new process (NP) and the two comparative processes.

Table 1

| Pulp | Purified Cellulose | | | | | | | | |
|---|---|---|---|---|---|---|---|---|---|
| | Yield, Percent | | | Alpha-Cellulose, Percent | | | Pentosan, Percent | | |
| | NP | CP/1 | CP/2 | NP | CP/1 | CP/2 | NP | CP/1 | CP/2 |
| A | 93.7 | 79.1 | 78.8 | 92.2 | 92.6 | 93.6 | 0.89 | 0.55 | 0.66 |
| B | 91.3 | 85.9 | 84.3 | 96.0 | 97.2 | 94.4 | 0.76 | 0.80 | 0.90 |
| C | 92.4 | 84.4 | 85.2 | 95.2 | 96.4 | 92.4 | 0.94 | 0.84 | 1.44 |
| D | 94.2 | 84.2 | 85.0 | 96.4 | 95.6 | 93.2 | 0.73 | 0.57 | 1.15 |
| E | 91.5 | 83.4 | 82.9 | 96.0 | 94.0 | 93.8 | 0.98 | 0.87 | 1.57 |
| F | 90.7 | 82.7 | 86.0 | 95.0 | 95.0 | 92.6 | 0.83 | 0.60 | 1.46 |

Table 2 shows the clarity of cellulose acetate prepared from the pulps purified by the same three processes.

Table 2

| Pulp | NP | CP/1 | CP/2 |
|---|---|---|---|
| A | 55 | 38 | 19 |
| B | 30 | 36 | 25 |
| C | 29 | 34 | 15 |
| D | 31 | 35 | 16 |
| E | 44 | 52 | 19 |
| F | 49 | 37 | 15 |

It will be clear that, while as would be expected the figures vary considerably with the particular pulp being treated, the yield obtained by the new process is consistently considerably higher than those obtained by the comparative processes, while on the whole the quality of the cellulose produced and the clarity of the cellulose acetate made therefrom are about the same as those achieved by the much more complicated comparative process CP/1 with its difficult filtration step and substantially better than those achieved by the two-stage process CP/2.

Although, as stated above, the new process is particularly valuable when employed as the only purifying step given to a pulp having an alpha-cellulose content of at least 85% and a pentosan content below 3.5%, it can also be applied to other pulps, either alone or in association with other purification steps; or when applied to relatively pure pulps having the composition specified it can, if desired, be associated with other purification steps. For example a pulp of lower alpha-cellulose and higher pentosan contents than those specified above might first be given a bleach, e. g. with chlorine or with an alkaline hypochlorite solution, and then be treated in accordance with the present invention. Again, when treating a relatively pure pulp, the new process might be preceded or followed by a boil under atmospheric or higher pressure with a very dilute alkali solution, e. g. with a solution of concentration 2%—3%, or it might be followed by a hypochlorite bleach. In general, however, it may be said that the main value of the new process is that, when applied to relatively pure pulps of a type now readily obtainable, it gives in a single purification stage and without operational difficulties cellulose which is suitable for conversion into cellulose acetate and other cellulose derivatives of good quality.

Cellulose acetate and other cellulose derivatives can be made by the usual methods from cellulose purified by the new process and can be used, for example, for the manufacture of filaments and other textile materials, of films and foils or the like, and of plastic compositions, for example moulding powders. Examples of such cellulose derivatives other than cellulose acetate are cellulose esters such as cellulose propionate, cellulose butyrate, cellulose crotonate, and mixed cellulose esters containing, for example, acetyl groups and propionyl, butyryl or crotonyl groups; cellulose ethers, e. g. water-soluble methyl cellulose, hydroxyethyl methyl cellulose, hydroxyethyl ethyl cellulose and carboxymethyl cellulose; and cellulose ethers soluble in organic solvents, for example ethyl cellulose of a moderately high or high ethoxyl content and benzyl cellulose. Cellulose purified by the new process can also be used in the production of viscose and cuprammonium solutions.

Having described my invention, what I desire to secure by Letters Patent is:

1. Process for purifying wood pulps having an alpha-cellulose content above 85% and a pentosan content below 3.5% whereby there is obtained a cellulose suitable for esterification, which consists in introducing the pulp into an aqueous caustic alkali solution of concentration 17–19% which is already at a temperature of 50–55° C., maintaining the mixture of pulp and alkali solution within this temperature range for 45–90 minutes, removing the greater part of the alkali solution from the treated pulp while maintaining the concentration of the alkali solution, and washing the pulp free from alkali with water at a temperature above 80° C.

2. Process for purifying wood pulps having an alpha-cellulose content above 85% and a pentosan content below 3.5% whereby there is obtained a cellulose suitable for esterification, which consists in introducing the pulp into 8 to 12 times its weight of an aqueous caustic alkali solution of concentration 17–19% which is already at a temperature of 50–55 C., maintaining the mixtures of pulp and alkali solution within this temperature range for 45–90 minutes, removing the greater part of the alkali solution from the treated pulp while maintaining the concentration of the alkali solution, and washing the pulp free from alkali with water at a temperature above 80° C.

STANLEY CHARLES BATE.

References Cited in the file of this patent

UNITED STATES PATENTS

| Number | Name | Date |
|---|---|---|
| 1,632,802 | Richter | June 21, 1927 |
| 1,830,131 | Plumstead | Nov. 3, 1931 |
| 1,857,100 | McCormick et al. | May 3, 1932 |
| 1,947,106 | Plumstead | Feb. 13, 1934 |
| 2,036,606 | Richter | Apr. 7, 1936 |
| 2,041,958 | Richter | May 26, 1936 |
| 2,187,710 | Goff et al. | Jan. 16, 1940 |
| 2,380,706 | Richter | July 31, 1945 |
| 2,385,259 | Collings et al. | Sept. 18, 1945 |
| 2,407,909 | Vincent et al. | Sept. 17, 1946 |

OTHER REFERENCES

Ott, "Cellulose and Cellulose Derivatives," 1943, pages 14, 269, 274, 275, 278, 603 and 813–815.